US00RE44486E

(19) United States
(12) Reissued Patent
Mallwitz

(10) Patent Number: US RE44,486 E
(45) Date of Reissued Patent: Sep. 10, 2013

(54) CIRCUIT APPARATUS FOR TRANSFORMERLESS CONVERSION OF AN ELECTRIC DIRECT VOLTAGE INTO AN ALTERNATING VOLTAGE

(75) Inventor: Regine Mallwitz, Kassel (DE)

(73) Assignee: SMA Solar Technology AG, Niestetal (DE)

(21) Appl. No.: 13/292,856

(22) Filed: Nov. 9, 2011

Related U.S. Patent Documents

Reissue of:
(64) Patent No.: 7,616,467
Issued: Nov. 10, 2009
Appl. No.: 12/069,329
Filed: Feb. 8, 2008

(30) Foreign Application Priority Data

Mar. 13, 2007 (EP) ..... 07005140
Jan. 21, 2008 (EP) ..... 08001035

(51) Int. Cl.
*H02M 7/5387* (2007.01)
*G05F 1/613* (2006.01)

(52) U.S. Cl.
USPC ..... 363/132; 363/65; 323/225; 323/272

(58) Field of Classification Search
USPC ..... 363/98, 132, 65; 323/225, 271, 323/272, 269, 282, 283–290
See application file for complete search history.

(56) References Cited

U.S. PATENT DOCUMENTS 4,654,769 A * 3/1987 Middlebrook ..... 363/16
5,602,464 A * 2/1997 Linkowsky et al. ..... 323/272
5,754,384 A * 5/1998 Ashley ..... 361/93.9
6,798,177 B1 * 9/2004 Liu et al. ..... 323/222
7,064,969 B2 * 6/2006 West ..... 363/132
7,157,891 B1 * 1/2007 Drury et al. ..... 323/282
7,193,396 B2 * 3/2007 Orr ..... 323/225
7,480,156 B1 * 1/2009 Wittenbreder, Jr. ..... 363/20
7,777,459 B2 * 8/2010 Williams ..... 323/266
2005/0146310 A1 * 7/2005 Orr ..... 323/222
2007/0120543 A1 * 5/2007 Caldwell ..... 323/272

FOREIGN PATENT DOCUMENTS

DE 202006001063 4/2006
DE 102004037446 6/2006

OTHER PUBLICATIONS

Kasa N et al: "A transformer-less inverter using buck-boost type chopper circuit for photovoltaic power system" Power Electronics and Drive Systems, 1999. PEDS '99. Proceedings of the IEEE 1999 International Conference on Hong Kong Jul. 27-29, 1999, Piscataway, NJ, USA, IEEE, US, Bd. 2, Jul. 27, 1999, pp. 653-658, XPO010351975, ISBN: 0-7803-5769-8.

(Continued)

*Primary Examiner* — Jessica Han
(74) *Attorney, Agent, or Firm* — Slater & Matsil, L.L.P.

(57) ABSTRACT

In a circuit apparatus for transformerless conversion of an electric direct voltage of a two-pole direct voltage source (1) connected to ground having a first voltage pole (+) and a second voltage pole (−) into an alternating voltage, hazardous capacitive leakage currents are avoided by connecting the direct voltage source (1) to ground and the DC-AC converter (400) is operated at a controlled intermediate circuit voltage, a DC-DC converter stage (300) being connected between the direct voltage source (1) and the DC-AC converter (400), said DC-DC converter stage providing at its output a +/− voltage that is symmetrical with respect to the grounding point, two series-connected capacitors (41, 42) having the same polarity and being connected to ground at their connecting point (V) and controlled are charged by two buck-boost choppers (100, 200) connected one behind the other.

25 Claims, 2 Drawing Sheets

(56) References Cited

OTHER PUBLICATIONS

Duran-Gomez J L et al: "Analysis and Evaluation of a Series-Combined Connected Boost and Buck-Boost DC-DC Converter for Photovoltaic Application" Applied Power Electronics Conference and Exposition, 2006. APEC '06. Twenty-First Annual IEEE Mar. 19, 2006, Piscataway, NJ, USA, IEEE, Mar. 19, 2006, ISBN: 0-7803-9547-6- pp. 981, paragraph III, p. 982.

Sunny Boy 1500—Technische Beschreibung, Jan. 27, 2007, XP002453580.

* cited by examiner

CIRCUIT APPARATUS FOR TRANSFORMERLESS CONVERSION OF AN ELECTRIC DIRECT VOLTAGE INTO AN ALTERNATING VOLTAGE

Matter enclosed in heavy brackets [ ] appears in the original patent but forms no part of this reissue specification; matter printed in italics indicates the additions made by reissue.

CROSS-REFERENCE TO RELATED APPLICATIONS

This application claims Priority from European Application Nos. EP 07005140.4 filed on 13 Mar. 2007 and EP 078001035.8 filed on 21 Jan. 2008

FIELD OF THE INVENTION

The invention relates in particular to a circuit apparatus for transformerless conversion of an electric direct voltage, e.g., from a solar generator, into an alternating voltage for feeding into a grid, dangerous capacitive leakage currents being prevented from occurring by connecting the direct voltage source to ground. Direct voltage sources such as solar generators, fuel cells, batteries and the like often have a strongly varying voltage and high inner impedance. In order to feed electric energy from such sources into a grid, a matching device is needed. For converting direct voltage supplied for example by a solar generator into alternating voltage, solar inverters are known. It is known to feed electric energy into a grid, which may be a utility grid or an island network for one or a few loads, using these inverters.

If high efficiency is achieved, the rentability of the matching device is improved and the heat losses of the installation are reduced. Therefore, high efficiency is very important. However, security aspects and costs are to be taken into consideration which may compromise efficiency.

As a rule, known matching devices with transformers, i.e., with galvanic isolation, are less efficient than such without transformers. Transformerless inverters for feeding into the grid are characterized by very high efficiency and by low weight. A transformerless DC-AC converter is thereby connected downstream of the solar generator in a known way, said DC-AC converter converting the direct voltage of the source into an alternating voltage. Transformerless inverters without galvanic isolation may however be the cause of safety problems due to grounding issues. Direct voltage sources such as a solar generator have a strongly fluctuating output voltage, e.g. through temperature changes, also at the Maximum Power Point (MPP). By connecting a DC-DC converter, for example a boost or buck converter, upstream thereof, it can be achieved in a known way that the DC-AC converter connected downstream thereof be designed for a fixed working point in the DC intermediate circuit rather than for the fluctuating input voltage range. Additionally, it is ensured that the input voltage needed at the DC-AC converter for the import mode of operation can also be supplied if the conditions are unfavourable. As a rule, the peak value of the grid voltage is lower than the voltage in the intermediate circuit, e.g., at the input of the DC-AC converter. If, in the prior art solutions, the voltage at the solar generator drops below a certain value such as for weather reasons, the solar plant is isolated from the grid so that there is no import any more. This lowers the efficiency of the installation.

DESCRIPTION OF THE PRIOR ART

An inverter concept with a buck chopper is shown and described in the document DE 20 2006 001 063 U 1. Said document DE 20 2006 001 063 U 1 discusses a solution in which the DC-DC converter includes a buck chopper downstream of which there is connected a full bridge or a DC-AC converter for mains electricity supply. In these solutions, the solar generator is not connected to ground, though. The disadvantage of this circuit is that the reference ground potential of a solar generator that is not connected to ground changes dynamically with the timing pulses of the inverter. The parasitic capacitances between the generator and the ground are charged and uncharged according to timing. Currents, so-called capacitive leakage currents, occur thereby between the solar generator and ground. These leakage currents constitute a hazard for humans touching the solar generator on the one side; on the other side, damages may occur to the solar generator itself.

A transformerless inverter for converting solar direct current into sine-shaped alternating voltage is known from the document DE 10 2004 037 446 B4. Capacitive leakage currents are intended to be prevented from occurring on the solar generator by connecting a symmetrical direct voltage boost chopper downstream of the solar generator. By providing a diode both in the positive and in the negative path in the symmetrical direct voltage boost chopper, leakage currents are prevented from occurring at the solar generator. If the switch of the boost chopper is closed, the diodes of the boost chopper lock. As a result, the solar generator is uncoupled from the alternating voltage side. According to the specification of this printed document, leakage current flow does not occur on the generator's side. Concurrently, the boost chopper mentioned provides a fixed operating voltage for the DC-AC converter mounted downstream thereof. A disadvantage however is that the solar generator has no defined relation to a ground potential. For, as a matter of principle, it is not possible to connect the generator to ground. However, only a connection to ground will make it possible to reliably prevent capacitive leakage currents.

U.S. Pat. No. 7,064,969 B2 proposes a transformerless inverter for converting solar direct current into sine-shaped alternating voltage. A parallel circuit consisting of a first buffer capacitor and of an inverse converter, a so-called buck-boost chopper, is connected downstream of a solar generator connected to ground. The solar generator charges this first buffer capacitor depending on the solar power that is available. A buck-boost chopper charges a second capacitor. The capacitors are connected in series and are grounded at their connection point. As a result, the solar generator is also connected to ground. A bridge circuit comes after the two series-connected capacitors, said bridge circuit providing, through a grid filter consisting of an inductor and a capacitor, a sine-shaped alternating voltage for feeding into a utility grid. Although in this solution hazardous leakage currents are prevented from occurring by connecting the solar generator to ground, the buck-boost chopper does not allow for a fixed point of operation for the DC-AC converter but only for the charging of the second half-bridge capacitor. The voltage at the first capacitor directly corresponds to the output voltage of the solar generator, while the voltage at the second capacitor is adjustable through the buck-boost chopper. As a result, there is a fixed coupling to the generator voltage on the one side, on the other side, the coupling can be chosen freely. This considerably limits the input voltage of the DC-AC converter since the output voltage is tolerated within narrow boundaries. A circuit apparatus for converting an electric direct voltage of a three-pole direct voltage source connected to ground is known from the publication KASA N ET AL: "Transformerless Inverter using Buck Boost Type Chopper Circuit for Photovoltaic Power System" POWER ELECTRONICS AND DRIVE SYSTEMS, 1999 PEDS, PROCEEDINGS OF THE IEEE 1999 INTERNATIONAL CONFERENCE IN HONG KONG 27-29. PISCATAWAY, NNJ, USA, IEEE, US, Vol. 2, 27. Jul. 1999, pages 653-658, XP 010351975, ISBN:0-7803-5769-8. Two solar generators are connected in series so that the connecting point of the two generators forms one first pole, namely a grounding pole. The positive pole of the first generator forms a second pole that corresponds to the positive pole and the second generator forms the third pole that corresponds to the negative pole. A capacitor is connected in parallel with each generator. A buck boost chopper consisting of a transistor, a coil and a diode is connected in parallel with a respective one of the capacitors. Each buck boost chopper is connected to a load-side capacitor via a switch provided on the output side. This load-side capacitor is connected in parallel with an AC load which may also be an AC network. Only one of the two buck boost choppers and, as a result thereof, only one of the two PV generators are working for each half-wave of the AC voltage.

The publication DURAN_GOMEZ J L ET AL: "Analysis and Evaluation of a Series-Combined Connected Boost and Buck-Boost DC-DC Converter for Photovoltaic Application" APPLIED POWER ELECTRONICS CONFERENCE AND EXPOSITION, 2006, APEC 06. TWENTY_FIRST ANNUAL IEEE MAR. 19, 2006, PISCATAWAY, NJ, USA, IEEE, Mar. 19, 2006, pages 979-985, XP01910063, ISBN: 0-7803-9547-6, shows a circuit array for converting the direct voltage of a two-pole grounded direct voltage source with a boost chopper and an inverting buck-boost chopper that are both connected in parallel with the DC source. This DC-DC converter, which consists of a boost and a buck-boost chopper, charges two series-mounted capacitors the point of connection of which is connected with the negative pole of the DC source and is connected to ground. The output voltage of the DC-DC converter is symmetrical with respect to ground potential (PE). A pulse-width controlled DC-AC converter is mounted downstream of said DC-DC converter.

The technical specification SUNNY BOY 1500—THE TRANSFORMERLESS STRING INVERTER FOR PHOTOVOLTAIC PLANTS [Online] Jan. 27, 2007, XP002453580, depicts a circuit array for converting the direct voltage of a two-pole grounded direct voltage source with a boost chopper and a DC-AC converter. The array has no transformer. The generator is not connected to ground (protective earth). During import, the positive and the negative line leading to the PV generator carry a life-threatening high touch voltage to ground potential (PE).

BRIEF SUMMARY OF THE INVENTION

It is the object of the invention to provide a circuit apparatus for converting an electric direct voltage into an alternating voltage for feeding into the grid without a transformer which allows both for connecting the direct voltage source to ground in order to prevent hazardous operating currents and for feeding into the grid under extremely bad conditions such as very low generator voltages, high efficiency being achieved, in particular by virtue of a fixed operating point of the DC-AC converter. This object is achieved by a circuit apparatus having the characterizing features of claim 1 in connection with the features recited in the preamble thereof.

In accordance with the invention, there is provided a DC-DC matching device that is connected downstream of the grounded solar generator and that provides at its output a +/− voltage that is symmetrical with respect to ground potential and has an amplitude which can be regulated to a constant value. This matching device essentially consists of two inverse converters that are connected one behind the other and are also referred to as an inverting buck-boost chopper for charging a respective one of the capacitors. These capacitors are connected in series and are grounded at their connection point. These capacitors are charged with the same polarity. The voltage height at the capacitors is controllable.

These capacitors may be a constituent part of the DC-AC converter circuit or of the DC-DC converter connected downstream thereof. The DC-AC converter is preferably controlled by pulse-controlled voltage pulses for controlling sine-shaped mains current for feeding into a grid.

The DC-AC converter is connected downstream of the DC-DC converter. This means that the energy flow generated by the generator flows from the DC-DC converter to the DC-AC converter.

This DC-AC converter is in particular provided with several semi-conductor switches that are timed according to control. This preferably occurs at a fixed operating point. The switches are more specifically designed only for this operating point, e.g., a fixed DC voltage. As a result, switches having a low reverse voltage capacity can be chosen, said switches having, as a rule, lower switching and on-state power loss. As a result, the efficiency of the DC-AC converter is higher. As a rule, the switches described are less costly to acquire, which is advantageous. More specifically, the fixed operating point is chosen such that import is possible. The voltage at the input of the DC-AC converter should be at least 10% above the peak value of the alternating voltage of the grid to be fed.

An inverter provided from the apparatus of the invention is preferably operated in solar plants, usually using a controller in the form of an MPPT (Maximum Power Point Tracking), so that the direct voltage generator delivers the highest possible power under all the given conditions. This allows for achieving high efficiency of the overall plant.

Further, the invention relies on the idea of taking advantage of a DC-DC matching device so that the voltage amplitude at the input of the DC-AC converter can be set to a constant value.

The DC-DC matching device consists of two buck-boost choppers, each charging one capacitor on the output side. The first buck-boost chopper, which consists of at least one switch, one diode and one choke, is connected in parallel with the direct voltage generator, downstream thereof. The output-side first capacitor is connected in parallel with the first buck-boost chopper downstream thereof and is charged by the first buck-boost chopper.

The second buck-boost chopper, which consists of at least one switch, one diode and one choke, is connected in parallel to the first capacitor, downstream thereof, and charges a second capacitor.

The invention allows for providing a high-efficiency transformerless inverter or transverter for feeding into the grid that prevents leakage currents from appearing at the direct current source by connecting it to ground and the DC-AC converter of which can be devised for a fixed DC working point or a fixed DC operating point. The inverter provided by the circuit apparatus of the invention is suited for converting a strongly varying direct voltage, more specifically from a solar generator, into an alternating voltage for feeding into a utility grid. A DC-DC converter stage is connected between the solar generator and the DC-AC converter. As a result, current and voltage can be set to fixed values at the input of the DC-AC converter. Accordingly, feeding into the grid is also possible if the voltages at the solar generator are low, in particular if the peak value of the grid voltage is small. This allows for compensating for grid voltage fluctuations without prejudice to efficiency.

Other fluctuations such as voltage fluctuations due to temperature changes at a solar generator may be taken into account at high efficiency and without interrupting the energy flow.

The inverter is implemented without a transformer. This results in high efficiency. Another advantage is the low weight.

Moreover, the two-pole source is connected to ground. As a result, capacitive leakage currents and their consequences such as hazard to humans and damages to the generator are avoided; more particularly, the reference potential of the solar generator with respect to ground is prevented from changing dynamically with timing pulses of the inverters. Parasitic capacitances are no longer charged or uncharged according to timing so that hazardous capacitive leakage currents are avoided between the direct voltage source and the ground.

In principle, there are provided two matching devices, a first matching device for charging the first capacitor being connected downstream of the direct voltage source and a second matching device for charging the second capacitor being connected in parallel with the first matching device, downstream thereof. By timing the switches of the inverse converters individually, the voltage of the capacitors can be set independent of each other. This makes it possible to very precisely and easily provide the +/− voltage symmetrical with respect to ground. High touch protection and high efficiency are possible as a result thereof. Additionally, the DC voltage can be increased, for example when the generator voltage drops and the generator voltage may for example be lowered if the working point of the generator moves toward idle. This is possible when efficiency is very high. Grid voltage fluctuations may also be compensated for at high efficiency.

Through the pulse-width controlled converter, it may also be possible to control the energy import so that voltage fluctuations of the alternating voltage grid are taken into account since the DC operating point of the DC-AC converter is fixed.

Moreover, the advantages mentioned are achieved by way of a simple circuit.

The invention will be better understood upon reading the following more detailed description of an exemplary embodiment.

DETAILED DESCRIPTION OF THE INVENTION

In the Figures, like parts are labelled with the same numerals.

Figure 1:
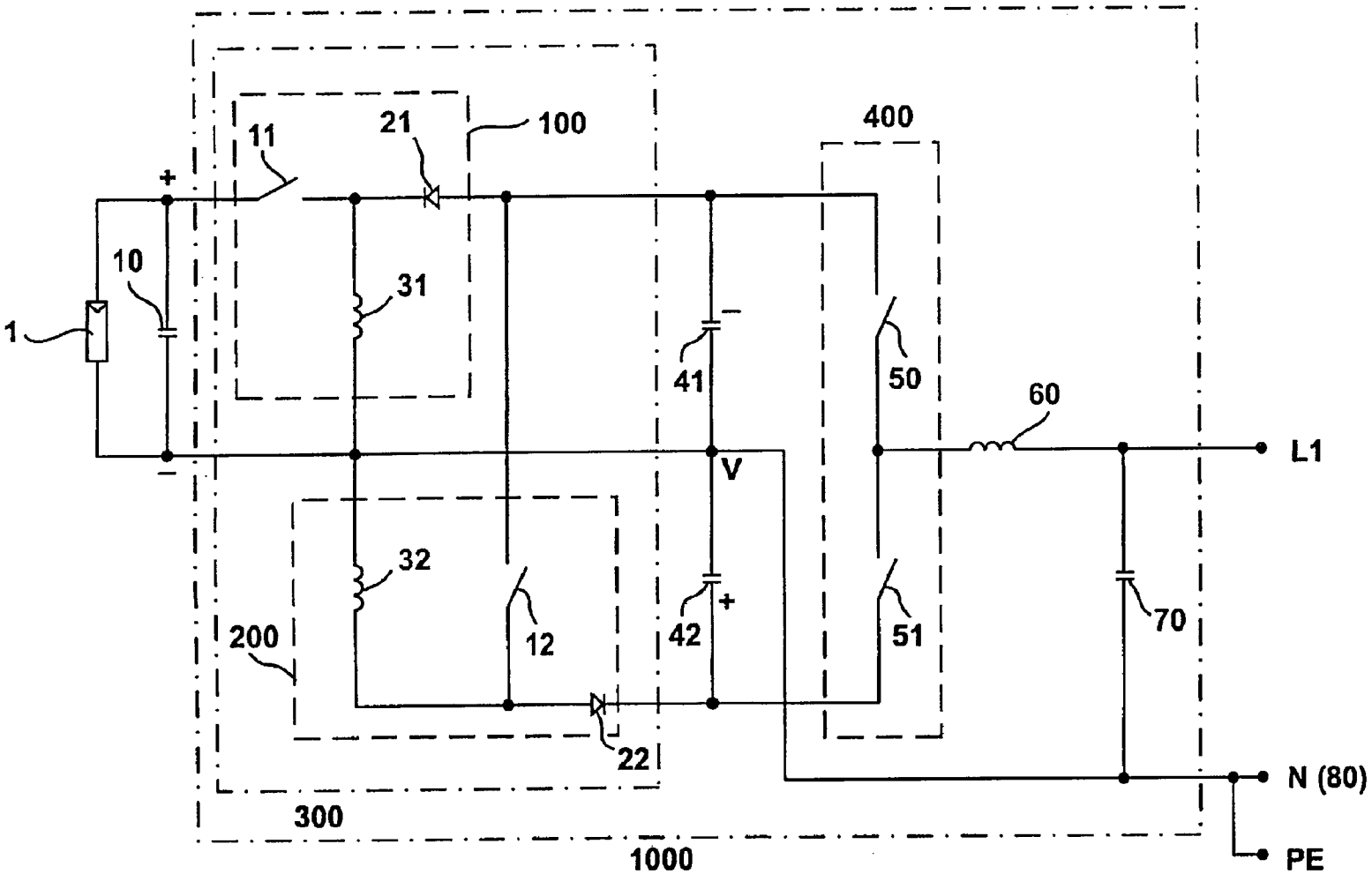
FIG. 1 shows an illustration of a circuit array of a circuit apparatus of the invention for feeding into a phase of an alternating voltage network and FIG. 2 shows an illustration of a circuit array of a variant of the circuit apparatus of the invention for three-phase infeed into a grid.

FIG. 1 shows an inverter 1000 for a direct voltage source, more specifically a photovoltaic generator 1 with one or several photovoltaic modules, said modules being adapted for series and/or parallel connection. In FIG. 1, the inverter 1000 is configured to be a single-phase inverter.

More specifically, the photovoltaic generator 1 has only two connections, namely a positive pole (+), which is located at the top in the drawing, and a negative pole (−). The negative pole (−) is connected to the grounding point, i.e., to the neutral conductor (N) of the alternating voltage network. Said neutral conductor (N) is connected to ground potential (PE).

A buffer capacitor 10 is connected in parallel with the photovoltaic generator 1. Downstream thereof, there is connected a DC-DC converter 300. This DC-DC converter 300 converts the direct voltage of the generator so that a +/− voltage that is symmetrical with respect to the grounding point (80) is available at its output. An intermediate circuit consisting of the series connection of the capacitors 41 and 42 as well as a DC-AC converter 400 with a grid filter consisting of a choke 60 and a capacitor 70 are connected downstream of the DC-DC converter 300. This array converts the output voltage of the DC-DC converter 300 into an alternating voltage suited for mains electricity supply.

As shown in FIG. 1, an inverting buck-boost chopper 100 is connected downstream of the solar generator or of the photovoltaic generator 1 to the buffer capacitor 10, said inverting buck-boost chopper consisting of one switch 11, one diode 21 and one inductance 31. The voltage at the capacitor 41 can be set by accordingly timing the switch 11. The functioning of an inverting buck-boost chopper is known.

A second inverting buck-boost chopper 200 consists of one switch 12, one diode 22 and one inductance 32 as can be seen from FIG. 1. The array charges the capacitor 42. The voltage at the capacitor 42 can be regulated by accordingly timing the switch 12. The second buck-boost chopper 200 is virtually connected downstream of capacitor 41 and inverts the voltage of the capacitor 41, which corresponds to the input voltage of the second buck-boost chopper 200.

The capacitors 41 and 42 are connected in series with the same polarity. The first capacitor 41 is charged by the upper array, the second capacitor 42 by the lower array. The voltage at the respective one of the capacitors 41 or 42 can be set by accordingly timing the respective switches 11 and 12.

The switch 11 and the diode 21 of the first buck-boost chopper 100 are connected in series. The switch 11 is connected to the positive pole of the DC generator and to the cathode of the diode 21. The anode of the diode 21 is connected to the negative pole of the capacitor 41. At a connection terminal, the choke 31 is connected to the connection point between the switch 11 and the diode 21. The second (other) connection terminal is connected to the negative pole of the DC generator 1. Between the negative pole of the DC generator 1 and the connection point between the switch 12 and the anode of diode 22 there is the choke 32. All three components form the second buck-boost chopper 200. The second connection terminal of the switch 12 is connected to the anode of diode 21 of the first buck-boost chopper. The cathode of diode 22 is connected to the second capacitor 42, in fact at the positive pole of the capacitor 42.

The positive pole of the first capacitor 41 and the negative pole of the second capacitor 42 are connected together and to the negative pole of the DC generator 1 or to the neutral conductor (N) or to the grounding point (PE).

Through this circuit topology, the lower buck-boost chopper 200 is connected downstream of the upper buck-boost chopper 100.

In FIG. 1, a DC-AC converter 400 is provided with the switches 50, 51. Through pulse-width controlled actuation of these switches 50, 51, an alternating voltage can be applied at the output.

The alternating voltage output of the half-bridge shown in FIG. 1 is connected to the alternating voltage network between the connection terminals L1 and N via a filter consisting of the choke 60 and the capacitor 70.

Preferably, the switches 11, 12, 50 and 51 are common semiconductor switches, more specifically MOSFETs, FETs or IGBTs with an inverse diode.

Figure 2:
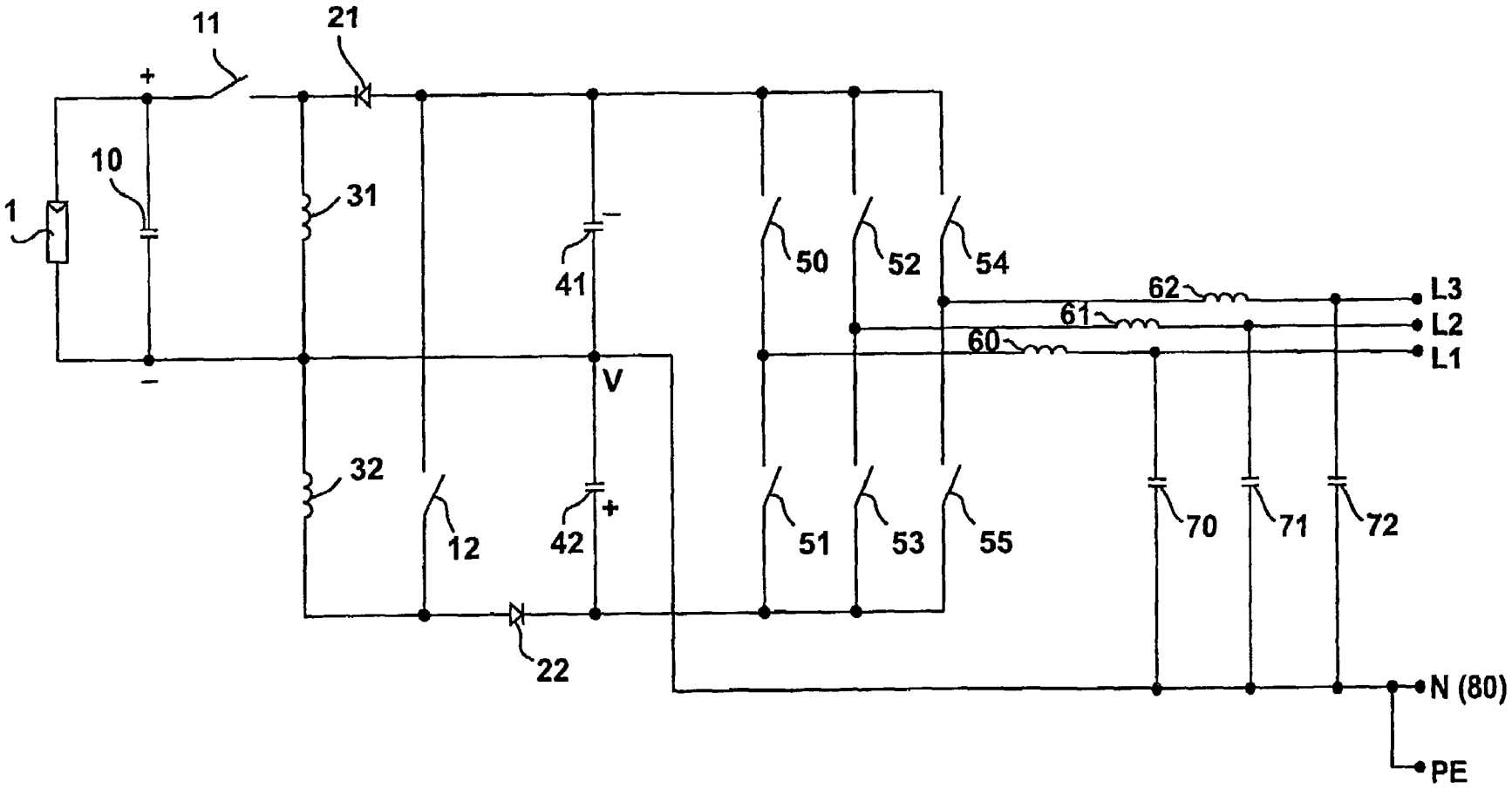

In order to increase the efficiency of the DC-DC matching device or of the DC-DC converter 300, low-loss semiconductor switches can be connected in parallel with the diodes 21 and 22, said semiconductor switches being added to the circuit in the conducting phases of the diodes. The DC-DC converter 300 allows for controlling the intermediate circuit voltage, i.e., input voltages, for the DC-AC converter 400. The DC-AC converter 1000 can be extended by adding additional bridge arms consisting of two series-connected switches each. This also allows for multiple-phase import. FIG. 2 shows an arrangement for feeding into a three-phase grid. In the circuits as shown in the FIGS. 1 and 2, there are two matching devices 100, 200, the first matching device 100 charging a first capacitor 41 and the second matching device 200 charging a second capacitor 42. The matching devices 100, 200 are configured such that there is a +/− output voltage, which is symmetrical with respect to ground potential 80, at the DC-DC converter stage. Further, the photovoltaic generator 1 is connected to ground at a voltage pole, in particular at the minus pole, in accordance with the invention.

The choppers 100, 200, which change an input side direct voltage on the output side so that the working point of the direct voltage source 1 of the photovoltaic generator 1 in particular may be changed, serve as the matching devices.

The invention is suited for a transformerless inverter or transverter for converting direct voltage from a direct voltage source, such as a solar generator, but also a wind energy plant with PM generator, a fuel cell, a battery or any other direct voltage source, into an alternating voltage for feeding into a grid, such as the utility grid or an island network.

Capacitive leakage currents are prevented by connecting the two-pole direct voltage source to ground.

LIST OF NUMERALS

1 SOLAR GENERATOR
10 buffer capacitor
11,12 switch
21,22 diode
31,32 inductance
41,42 capacitor
50, 51 switch
60,61,62 filter choke
70,71,72 filter capacitor
100, 200 buck-boost chopper
300 DC/DC converter
400 DC/AC converter
1000 inverter

I claim:

1. A circuit apparatus for transformerless conversion of an electric direct voltage of a [two-pole] direct voltage source [(1)] connected to ground having a first voltage pole [(+)] and a second voltage pole [(−)] into an alternating voltage for feeding into an alternating voltage network, a DC-AC converter [(400)] for feeding into said alternating voltage network being connected downstream of a DC-DC converter [(300)], and [two] *first and second* capacitors [(41, 42)] being present in an intermediate circuit between [said] *the* DC-DC converter [(300)] and [said] *the* DC-AC converter [(400)], said capacitors being connected in series and comprising a connection point [(V)] at ground potential so that a +/− voltage that is symmetrical with respect to ground potential [(80)] is available on [the] *an* output side of the DC-DC converter [stage (300)], [characterized in that there is provided] *comprising*:

a first inverting buck-boost chopper [(100) that is] connected in parallel with the direct voltage source [(1)] downstream thereof and [that is] connected such that it charges the first capacitor [(41)]; and a second inverting buck-boost chopper [(200) that is] connected [in parallel] with [said] *the* first *inverting* buck-boost chopper [(100)] downstream thereof and [is] connected such that [it] *the second inverting buck-boost chopper* charges the second capacitor [(42)],

*wherein* the [two] *first and second inverting* buck-boost choppers [(100, 200) forming] *form* the DC-DC converter [(300)], *wherein* the first *inverting* buck-boost chopper [(100) consisting of at least one] *comprises a* first switch [(11)], [at least one] *a* first diode [(21)] and [at least one] *a* first choke [(31)], *and wherein* said second *inverting* buck-boost chopper [(200) consisting of at least one] *comprises a* second switch [(12)], [at least one] *a* second diode [(22)] and [at least one] *a* second choke [(32)].

2. The circuit apparatus as set forth in claim 1, [characterized in that each] *wherein the first and second inverting* buck-boost [chopper (100, 200) is] *choppers are* configured [such that there is] *to set* a [fixed] DC operating point for the DC-AC converter [(400)], and [that] *wherein* the direct voltage source [(1)] is connected to ground at one of the voltage poles [(−)].

3. The circuit apparatus as set forth in claim [2] *1*, [characterized in that] *wherein* a controlled +/− DC voltage and/or a controlled constant +/− current is available at [the one] *an* input of the DC-AC converter.

4. The circuit apparatus as set forth in claim [3] *2*, [characterized in that a] *wherein the* DC operating point is at least 10% higher than a maximum momentary value of [the] *a* grid voltage of a connected grid [(80)].

[5. The circuit apparatus as set forth in claim 2, characterized in that a DC operating point is at least 10% higher than a maximum momentary value of the grid voltage of a connected grid (80).]

6. The circuit apparatus as set forth *in* claim 1, [characterized in that] *wherein* the DC-AC converter [(400)] is configured to be pulse-width controlled for controlling a sine-shaped current and for controlling an import variable for a grid [(60)].

7. The circuit apparatus as set forth in claim 1, [characterized in that] *wherein* the DC-AC converter [(400)] is configured to be single-phase [or multiple-phase].

8. The circuit apparatus as set forth *in* claim 1, [characterized by an implementation for a photovoltaic generator (1) as] *wherein* the direct voltage source *comprises a photovoltaic generator*.

[9. A method for diverting capacitive leakage currents away and for protecting persons against hazards and solar generators against damages using a circuit apparatus as set forth in claim 1.]

*10. The circuit apparatus as set forth in claim 1, wherein the first inverting buck-boost chopper consists of the first switch, the first diode and the first choke.*

*11. The circuit apparatus as set forth in claim 1, wherein the second inverting buck-boost chopper consists of at the second switch, the second diode and the second choke.*

*12. An apparatus comprising:*

*a first inverting buck-boost chopper connected in parallel with a direct voltage source, the first inverting buck-boost chopper comprising a first switch, a first diode and a first choke;*

*a second inverting buck-boost chopper connected in a cascade arrangement with the first inverting buck-boost*

*chopper, the second inverting buck-boost chopper comprising a second switch, a second diode and a second choke;*

*a first capacitor, wherein the first inverting buck-boost chopper is connected in parallel with the first capacitor; and*

*a second capacitor, wherein the second inverting buck-boost chopper is connected in parallel with the second capacitor, and wherein the first capacitor is connected in series with the second capacitor.*

*13. The apparatus as set forth in claim 12, further comprising an DC-AC converter connected in parallel to the first and second capacitors.*

*14. The apparatus as set forth in claim 12, wherein the first inverting buck-boost chopper consists of the first switch, the first diode and the first choke, and wherein the second inverting buck-boost chopper consists of at the second switch, the second diode and the second choke.*

*15. The apparatus as set forth in claim 12, wherein a voltage pole of the direct voltage source is connected to ground.*

*16. An apparatus comprising:*

*a first inverting buck-boost chopper configured to invert a first DC voltage received from a first input terminal and a second input terminal to a first inverted DC voltage;*

*a second inverting buck-boost chopper configured to invert a second DC voltage to a second inverted DC voltage, the second DC voltage being the same as the first inverted DC voltage;*

*a first capacitor configured to be charged by the first inverting buck-boost chopper; and*

*a second capacitor configured to be charged by the second inverting buck-boost chopper, wherein a positive pole of the first capacitor and a negative pole of the second capacitor are connected to a connection point, and wherein the connection point is connected to ground.*

*17. The apparatus as set forth in claim 16, wherein the connection point is connected to the second input terminal.*

*18. The apparatus as set forth in claim 16, further comprising an DC-AC inverter configured to invert the first inverted DC voltage and the second inverted DC voltage to an AC voltage.*

*19. The apparatus as set forth in claim 18, wherein the DC-AC inverter is a multiple phase DC-AC inverter.*

*20. The apparatus as set forth in claim 16, wherein the first DC voltage is provided by a photovoltaic generator.*

*21. The apparatus as set forth in claim 16, wherein the first inverting buck-boost chopper comprises a first switch, a first diode and a first choke, and wherein the second inverting buck-boost chopper comprises a second switch, a second diode and a second choke.*

*22. An apparatus comprising:*

*a first input terminal;*

*a first node, a second node, a third node, and a fourth node;*

*a first inductor, the first inductor being connected to the first node and the second node;*

*a first switch, the first switch being connected to the first input terminal and to the first node;*

*a first diode, a first cathode terminal of the first diode being connected to the first node and a first anode terminal of the first diode being connected to the third node;*

*a second input terminal, the second input terminal being connected to the second node;*

*a first output terminal, the first output terminal being connected to the third node;*

*a second output terminal, the second output terminal being connected to the second node;*

*a second inductor, the second inductor being connected the second node and the fourth node;*

*a second switch, the second switch being connected to the third node and the fourth node; and*

*a second diode, a second anode terminal of the second diode being connected to the fourth node and a second cathode terminal of the second diode being connected to a third output terminal.*

*23. The apparatus as set forth in claim 22, further comprising*

*a first capacitor, the first capacitor being connected to the first output terminal and the second output terminal, and*

*a second capacitor, the second capacitor being connected to the second output terminal and the third output terminal.*

*24. The apparatus as set forth in claim 22, further comprising*

*a fifth node;*

*a third switch, the third switch being connected to the first output terminal and the fifth node; and*

*a fourth switch, the fourth switch being connected to the third output terminal and the fifth node.*

*25. The apparatus as set forth in claim 22, wherein the second input terminal and the second output terminal are set to ground.*

*26. An apparatus comprising:*

*a first inverting buck-boost chopper configured to invert a first DC voltage received from a first input terminal and a second input terminal to a first inverted DC voltage;*

*a second inverting buck-boost chopper configured to invert a second DC voltage to a second inverted DC voltage, the second DC voltage being the same as the first inverted DC voltage;*

*a first capacitor configured to be charged by the first inverting buck-boost chopper;*

*a second capacitor configured to be charged by the second inverting buck-boost chopper; and*

*a DC-AC inverter configured to invert the first inverted DC voltage and the second inverted DC voltage to an AC voltage.*

*27. The apparatus as set forth in claim 26, wherein the DC-AC inverter is a multiple phase DC-AC inverter.*

* * * * *